Patented Feb. 13, 1951

2,541,688

UNITED STATES PATENT OFFICE 2,541,688

TREATMENT OF EARTH FORMATIONS PENETRATED BY A DEEP WELL BORE

Paul H. Cardwell, Tulsa, Okla., assignor to The Dow Chemical Company, Midland, Mich., a corporation of Delaware No Drawing. Application August 20, 1949, Serial No. 111,577

3 Claims. (Cl. 166—22)

This invention relates to methods of treatment of earth formations involved in the production of oil. It more particularly concerns an improved method of regulating the fluid permeability of oil-bearing zones penetrated by a well bore. The invention finds its widest application in oil-producing areas in which production is effected by forcing air, gas, or water into a plurality of producing strata through input wells drilled thereinto to drive the oil to recovery wells.

It is well-known in the art of petroleum production that, after a well partly or wholly ceases to receive oil by natural flow from the earth it penetrates, flow may be stimulated by injecting a fluid, such as water or gas, into the oil-bearing earth from a nearby well. In operations of this kind, it is usual to employ a number of input and output wells that are suitably disposed with respect to each other in the producing formation to secure the utmost in driving effect of the injected fluid. However, in some fields, the oil is contained in two or more overlying earth strata or zones often of widely differing permeability owing to differences in size of the interstices between the particle constituting the earth strata. These differences in permeability usually result in the more permeable oil-bearing strata becoming depleted of oil before the less permeable ones. In addition, when it is attempted to inject a pressuring or driving fluid into an input well penetrating a plurality of oil-containing strata, the more permeable strata receive the fluid in preference to the others. This has the disadvantage of greatly reducing the effectiveness of the driving fluid in driving oil out of the less permeable formations and increases the volume of fluid which must be injected to obtain production from the less permeable formations. Heretofore, attempts to drive oil from an oil-bearing formation of relatively low permeability adjacent to a formation having a relatively higher permeability have not been wholly satisfactory due largely to the difficulty of adequately preventing the driving fluid from by-passing the formation of relatively lower permeability.

Accordingly, it is the principal object of the invention to provide a method of equalizing the permeability of adjacent formations of differing permeabilities so that each exhibits substantially the same permeability and thus obviates the tendency for the driving fluid to by-pass the less permeable formations. Other objects and advantages will appear as the descripion of the invention proceeds.

The objectives of the invention are achieved by the injection into an earth stratum of known permeability of certain phenolic-aldehydic type resin-forming liquid mixtures having the property of forming in situ a solid coherent resinous deposit of a predetermined smaller volume than the mixture. The deposit, being smaller in volume than the liquid, partially blocks the interstices of the formation and its permeability is thereby reduced to a predetermined extent sufficient to equalize its permeability with that of an adjacent formation of lesser permeability from which the treating liquid is excluded. The phenolic-aldehydic type of resin-forming liquids I have compounded for the purpose are of such a nature that the volume of resin produced therefrom is subject to control in accordance with the invention by diluting the resin-forming liquids involved with a non-aqueous diluent which is soluble in the resin-forming liquid but not in the resin deposited therefrom. The percentage, D, by volume of diluent to use in the diluted resin-forming liquid of the type employed, I have found, depends upon the ratio, R, of the permeability, $P_m$, measured in darcys, of the more permeable formation whose permeability is to be equalized with that of a formation having a lesser permeability, $P_l$, as shown in the following equations:

$$R = \frac{P_l}{P_m}; \quad D = 100 R^{0.262}$$

For the purpose of the invention, it is desirable to prepare a pair of partly condensed or resinified but relatively stable resin-forming liquid mixtures of the phenolic-aldehydic type, each of which is diluted with the necessary amount of diluent. Just before use, the diluted partially resinified liquid mixtures are mixed together, preferably in equal volumes, to make a single diluted resin-forming liquid mixture, and, at the time of such mixing, a catalyst is added promoting further condensation or resinification in situ, whereby a solid resin is deposited from the mixture and the diluent is rejected. In this way, it is possible to prepare in advance of injection into the formations a stock of resin-forming liquids that is comparatively stable at room temperatures while the liquids are stored unmixed. For convenience in referring to the two partially resinified liquids, they are designated A and B, respectively.

PREPARATION OF A PARTIALLY RESINIFIED LIQUID A

Phenol, formaldehyde (or paraformaldehyde) and an alkaline catalyst (e. g. an alkali metal hydroxide or carbonate) are mixed and partially reacted together in the following proportions per mole of phenol:

Formaldehyde _____ 0.75 to 2.0 moles as HCHO
Alkali catalyst _____ 0.015 to 0.6 mole (calculated as NaOH equivalent)
Water _____ Up to 20 moles The mixture is reacted, preferably at about 125° F. in a covered vented vessel at atmospheric pressure, until the viscosity, measured at 80° F., is between about 25 to 200 centipoises or cps. The reaction is exothermic and as it gets under way, it is necessary to employ cooling means to prevent the mixture from becoming overheated. After the viscosity reaches a value in the specified range, the mixture is acidified to a pH between about 4 and 6 and it is then allowed to settle whereupon it separates into two layers. The watery layer, which is on top, is rejected. The lower layer has a viscosity of 100 to 2000 cps. depending upon the length of the reaction time and there is stirred into it, until dissolved, resorcinol or phloroglucinol in amount between about 0.67 and 1.8 moles per mole of phenol originally used. Solution is complete in about 30 minutes and the resulting liquid mixture has a viscosity of from 75 to 2000 cps. The liquid mixture thus obtained is capable of being stored at room temperature for long periods without significant change and is designated as partially resinified liquid A.

PREPARATION OF PARTIALLY RESINIFIED LIQUID B

One of the nuclear alkylated phenols, meta-cresol, 3.5-dimethyl phenol, 3-methyl 5-ethyl phenol, or cresylic acid containing 25 to 35 per cent of meta-phenolic compounds, paraformaldehyde (or formaldehyde), and an alkaline catalyst in aqueous solution are mixed and partially reacted together in the following proportions per mole of nuclear alkylated phenol:

|  | Moles |
|---|---|
| Paraformaldehyde (calculated as HCHO) | 2.25 to 4.5 |
| Alkali catalyst (e. g. NaOH, Na₂CO₃, KOH) | 0.006 to 0.28 |
| Water | Up to 20 |

The mixture is reacted at about 130° F. under atmospheric pressure until in about 30 minutes the viscosity reaches a value between about 150 to 5000 cps., the exothermic heat is removed during the reaction by suitable means to prevent overheating. The reaction mass is then acidified with 32 per cent aqueous hydrochloric acid to a pH between 3.5 and 6. The resulting liquid has a viscosity between about 50 to 2000 cps. and is designated as resin-forming liquid B.

The following specific examples will serve to illustrate the preparation of two partially resinified liquids, A and B.

Example of partially resinified liquid A

Mix together 390 pounds (4.15 moles) phenol, 506 pounds of 37 per cent by weight formaldehyde (6.24 moles HCHO), and 25 pounds of sodium hydroxide (0.625 mole) dissolved in 25 pounds of water. The total weight of the foregoing mixture is 946 pounds and its density at 80° F. 9.3 pounds per gallon. The mixture is heated to 175° F. in a vented jacketed reaction vessel. As the reaction proceeds, cooling water is circulated in the jacket to prevent the reaction mass from becoming hotter than 175° F. After the viscosity reaches 47 cps., the reaction mass is cooled to 80° F. Its weight is then 937.8 pounds and density 9.75 pounds per gallon. To the cooled mass is added 7.8 gallons of 32 per cent HCl (0.66 mole HCl) with stirring, thereby reducing the pH to 5 and increasing the total weight to 1013.5 pounds having a volume of 104 gallons. The acidified mixture is settled allowing the formation of two layers. The top layer which consists mainly of sodium chloride dissolved in water weighs 334.2 pounds, its density is 9.27 pounds per gallon, its viscosity 3 cps. It is rejected. The lower layer consists of 697.3 pounds of resinous liquid having a density of 10.0 pounds per gallon and viscosity at 80° F. of 230 cps. To the resinous liquid, thus obtained, is added 410 pounds of resorcinol and the mixture is stirred for 30 minutes whereupon the resorcinol dissolves. The resulting resin-forming liquid (designated A) weighs 1089.3 pounds has a density of 10.2 pounds per gallon and viscosity at 80° F. of 250 cps.

Example of partially resinified liquid B 600 pounds of meta-cresol (5.56 moles), 500 pounds of paraformaldehyde (16.67 moles of HCHO), and 25 pounds of a 50 per cent aqueous solution of NaOH (0.31 mole NaOH, 0.70 mole H₂O) are mixed together forming a mixture weighing 1125 pounds. The mixture is heated to about 130° F. and maintained at this temperature at atmospheric pressure during the ensuing reaction by using cooling means to remove the exothermic reaction heat. In 30 minutes, the reaction mass is cooled to 80° F. Its viscosity at 80° F. is 3520 cps., the weight is 1125 pounds and density 10.2 pounds per gallon. With the cooled reaction mass is mixed 3.9 gallons of 32 per cent HCl (0.33 mole HCl) to reduce the pH to 5. The weight of the resulting resin-forming liquid B is 1162.9 pounds, the density 10.2 pounds per gallon, and viscosity 1720 cps.

DILUTION OF LIQUIDS A AND B

As aforesaid, before use, the two partially resinified liquids are individually diluted to the same extent (usually between about 10 per cent and 75 per cent by volume of diluent) with a non-aqueous liquid diluent which is soluble in the liquid but not in the solid resin produced when the liquids A and B are mixed and further resinified to produce a solid resin in situ in an earth formation with the aid of a catalyst. Suitable diluents are ethyl alcohol, methyl alcohol, and isopropyl alcohol. The amount of diluent to add to each of the liquids A and B is determined by the ratio R as set forth in the algebraic formula above.

Example of dilution

The following example based upon equalizing the permeability of two permeable zones of differing permeability with a zone of relatively low permeability, will serve to illustrate the procedure used to compute the percentage of dilution required:

By permeability measurements of cores taken from each zone, it is found that the three zones have permeabilities of 22, 14 and 4 darcys, respectively, the zone of 14 darcys' permeability being between the 4 and 22 darcy zones, the latter being uppermost in the well. In order to equalize the permeability of the three zones, it is necessary to reduce separately the permeability of the 22 darcy and the 14 darcy zones to 4 darcys, the 4 darcy zone being left untreated. The value of R in the foregoing formula in changing the 22 darcy zone to 4 is 4/22 or 0.182 and that in changing the 14 darcy zone to 4 is 4/14 or 0.286. From these values of R, D is computed to be 64 per cent and 72 per cent for the 22 and 14 darcy zones, respectively. This means that to reduce the permeability of the 22 darcy zone to 4 darcys, a diluent, e. g. ethyl alcohol, is mixed with the resin-forming liquid mixture in the proportion of 64 parts of diluent to 36 parts of resin-forming liquid by volume; and to reduce the 14 darcy zone to 4 suitable amounts of each of the two liquids A and B are diluted in the proportion of 72 parts of diluent to 28 parts by volume of the resin-forming liquid.

CATALYZING THE DILUTED RESIN-FORMING LIQUID MIXTURE

At the time the partially resinified liquids A and B are mixed, as in equal volumes, to form a single resin-forming liquid mixture and appropriately diluting as described prior to injection into the earth formation to be treated, an alkaline catalyst is also added to promote further condensation which results in producing a hard resin from the mixture in situ. The amount of catalyst to use is based upon the percentage of dilution and the amount of phenol in the mixture of liquids A and B due to the phenol content of the partially resinified liquid A in the mixture. Inasmuch as the time required for the injection varies with different wells, it is convenient to employ an amount of catalyst which will allow ample time for injection for the majority of cases before gelation of the resin begins, for example, 2 hours. If more time is required for injection somewhat less catalyst may be used and likewise if gelation is desired sooner somewhat more catalyst may be used.

The following table sets forth the number of moles of alkali calculated as NaOH to use per mole of phenol in the single resin-forming mixture obtained by mixing equal volumes of the specific examples of liquids A and B for various dilutions, D, of the mixture to produce gelation of the resin in 2 hours. The gelled resin becomes hard in about 24 hours or in a length of time equal to about 12 times the gelation time.

*Table*

| Per Cent by Volume of Diluent Used, D | 20 | 30 | 40 | 50 | 60 | 70 |
|---|---|---|---|---|---|---|
| Moles of alkali per mole phenol | 0.024 | 0.037 | 0.053 | 0.081 | 0.112 | 0.182 |

The alkali (e. g. NaOH, KOH, Na$_2$CO$_3$, K$_2$CO$_3$) is dissolved in water to make a 25 per cent solution and the solution is added to the diluted resin-forming liquid mixture in the proportions shown in the table. Intermediate proportions may be obtained by interpolation, others by extrapolation.

*Example of catalyzing the earth treating mixture*

Referring to the equalization of the 22 darcy zone, the 14 darcy zone, and the 4 darcy zone aforementioned as illustrative of catalyzing the mixtures of A and B, these are diluted to a diluent concentration of 64 per cent (for the 22 darcy zone) and the diluted mixture requires 0.136 mole of alkali (by interpolation from the table) per mole of phenol. And, since the phenol content is 4.15 moles, the amount of catalyst required is 4.15×0.136=0.565 mole of NaOH, for example, or 22.6 pounds if the entire batch (1089.3 pounds) is used. If a smaller amount of resin-forming liquid mixture is to be used, say, one-half or one-quarter as much, then the amount of catalyst to use would be proportionately smaller, namely, 11.3 pounds or 5.65 pounds, respectively. The catalyst is dissolved in water preferably to make a 25 per cent solution before the addition.

Similarly, the quantity of alkali to use for the mixture of liquids A and B diluted to a diluent concentration of 72 per cent (for treating the 14 darcy zone) is 0.2 mole per mole of phenol or 4.5×0.2=0.830 mole of NaOH, for example, or 33.2 pounds for the entire batch of 1089.3 pounds of resin-forming liquid A. Smaller amounts require proportionately smaller quantities of catalyst.

EQUALIZING THE PERMEABILITY OF THE ZONES

In treating the uppermost zone (22 darcy zone), the underlying zones may be protected so as to exclude the resin-forming liquid mixture from them by filling the well hole with sand or other easily removable material to a depth sufficient to cover the 14 and 4 darcy zones. The top of the sand bridge may be given a temporary seal as by introducing into the well a quantity of an organic jellifying material as disclosed in U. S. Patent 1,998,756 and allowing the material to overlay the sand. A string of tubing carrying a packer at the lower end is run into the well and the packer set at the top of the 22 darcy zone to be treated. After setting the packer, a quantity of the mixed resin-forming liquids A and B, containing 64 parts of diluent by volume and a catalyst promoting the deposition and hardening of the resin produced from the mixture, is introduced into the zone through the tubing string and followed by a displacing liquid, such as oil or water, so as to impregnate the zone with the diluted mixture, preferably to a depth of about 6 inches or more, and clear the tubing string and well hole of the mixture. After allowing the resin to deposit upon the particles of the earth formation and harden in situ, a result which requires about 2 hours time at least, the packer is unseated and the temporary bridge circulated out of the well hole until the 14 darcy zone is exposed. Thereafter, the top of the remaining sand column may be sealed with organic jellifying material as before. The tubing string and packer are lowered so that the packer may be set just at the top of the 14 darcy zone. After setting the packer just above the 14 darcy zone, a quantity of the mixed resin-forming liquids A and B containing 72 per cent of diluent by volume and a catalyst promoting the deposition and hardening of the resin produced from the mixture is introduced into the zone through the tubing string followed by a displacing liquid so as to impregnate the 14 darcy zone and clear the tubing string and well hole of resin-forming liquid. After allowing about 2 hours for the resin to deposit and harden in the interstices the packer is unseated and the remainder of the bridge is circulated out of the well. In the foregoing manner, the permeabilities of the 22 darcy zone and the 14 darcy zone are individually reduced to a permeability of 4 corresponding to the permeability of the least permeable zone so that each of the three zones exhibits substantially the same permeability after the treatment.

The foregoing description is illustrative of the practice of the invention rather than strictly limitative as it will be apparent that various changes may be made in the procedures illustrated, such as equalizing the permeabilities of any number of strata with that of another without departing from the spirit of the invention or the scope of the subjoined claims.

I claim:

1. In a method of equalizing the permeability of an earth stratum having a permeability, $P_m$, with that of another having a lesser permeability $P_l$, the permeabilities being measured in darcys, both strata being penetrated by the same well bore, the steps which comprise injecting through the well bore into the stratum having the permeability $P_m$ a resinous liquid mixture while excluding the same from the stratum having the permeability $P_l$, said resinous liquid mixture consisting of two partially resinified phenolic-aldehydic resinous liquids, a catalyst promoting the further condensation of the phenolic-aldehydic constituents of the resinous liquid mixture into a solid resin in situ, and a diluent soluble in the liquid mixture but insoluble in the solid resin produced therefrom, one of said partially resinified phenolic-aldehydic resinous liquids being formed by partially condensing phenol and an aldehyde selected from the group consisting of formaldehyde and paraformaldehyde in the proportion of 0.75 to 2 moles of HCHO per mole of phenol in the presence of an alkaline catalyst selected from the group consisting of alkali metal hydroxides and carbonates in the proportion of 0.015 to 0.6 moles of the alkali per mole of phenol, and water in amount not exceeding 20 moles per mole of phenol, the reaction being continued until upon acidification two liquid layers are formed; acidifying the resulting partially condensed reaction mass to a pH of 4 to 6, whereby two liquid layers form on standing; separating the lower liquid layer from the upper liquid layer; treating the lower layer by dissolving therein a polyhydroxybenzene selected from the group consisting of resorcinol and phloroglucinol in the amount of 0.67 to 1.8 moles per mole of phenol; the other said partially resinified phenolic-aldehydic resinous liquids being formed by partially condensing a nuclear alkylated phenol selected from the group consisting of meta-cresol, 3,5-dimethyl phenol, 3-methyl 5-ethyl phenol, and cresylic acid containing 25 to 35 per cent of meta-phenolic compounds with an aldehyde selected from the group consisting of formaldehyde and paraformaldehyde in the proportions of 2.25 to 4.5 moles of the aldehyde calculated as HCHO per mole of the alkylated phenol in the presence of an alkali catalyst selected from the group consisting of the alkali metal hydroxides and carbonates in the proportion of 0.006 to 0.28 moles of alkali per mole of alkylated phenol, and water in amount not exceeding 20 moles per mole of alkylated phenol, the reaction being continued until the viscosity measured at 80° F. reaches a value between 150 and 5000 cps.; acidifying the resulting reaction mass to a pH between 3.5 and 6, said resinous liquid mixture being diluted with an aliphatic alcohol selected from the group consisting of methyl alcohol, ethyl alcohol, and isopropyl alcohol in a proportion in parts by volume, D, per 100 parts of the diluted mixture according to the equation: $D = 100R^{0.262}$ in which R is the ratio: $P_l/P_m$, the resulting diluted resin-forming liquid mixture having added to it an alkaline catalyst selected from the group consisting of the alkali metal hydroxides and carbonates in a proportion sufficient to produce deposition and hardening of solid resin in situ.

2. In the method according to claim 1 the use of ethyl alcohol as the diluent and resorcinol as the polyhydroxybenzene.

3. In the method according to claim 2 the use of the two partially condensed phenolic-aldehydic resinous liquids in substantially equal volumes.

PAUL H. CARDWELL.

No references cited.